United States Patent

Krafft

[15] 3,703,846
[45] Nov. 28, 1972

[54] MACHINE TOOL SPINDLE AND DRIVE

[72] Inventor: Lewis E. Krafft, 10 Gromer Road, Elgin, Ill. 60120

[22] Filed: Nov. 16, 1970

[21] Appl. No.: 89,630

[52] U.S. Cl. ...................................90/11 A, 408/124
[51] Int. Cl. ..................................................B23c 1/00
[58] Field of Search ...............408/124, 125; 90/11.1; 51/170 PT, 134.5

[56] References Cited

UNITED STATES PATENTS

| | | | |
|---|---|---|---|
| 1,241,659 | 10/1917 | Ritz | 51/134.5 |
| 2,112,695 | 3/1938 | Forss | 51/170 PT |
| 1,259,132 | 3/1918 | Ritz | 51/170 PT |
| 2,375,490 | 5/1945 | Overly | 51/170 PT |

Primary Examiner—Harold D. Whitehead
Attorney—Richard J. Myers

[57] ABSTRACT

A machine tool includes a housing having a drive spindle rotatably supported therein by bearing means including a lower bearing and an intermediate bearing. The spindle is provided with a tool holder or chuck projecting outwardly at the housing and a labyrinth type seal cooperates with a removable cap to effectively seal the lower portion at the housing. An armature shaft is supported at its lower end on the intermediate bearing and is removably connected to said spindle by a threaded bore and stud arrangement to provide an effectively balanced shaft and spindle assembly. The armature is easily replaced and assembled through the upper end of the housing which has removably connected thereto a cap which supports a third bearing rotatably supporting the upper end of the armature shaft.

20 Claims, 3 Drawing Figures

PATENTED NOV 28 1972

3,703,846

Inventor:
Lewis E. Krafft
By Richard J. Myers
Atty.

MACHINE TOOL SPINDLE AND DRIVE

SUMMARY

The invention relates to a machine tool such as an electrically driven drill, broaching, engraving or other rotary cutting mechanism. In the use of devices of this type, it is particularly important that the armature shaft and drive spindle be easily removable and replaceable for maintenance purposes as well as to provide for a well-balanced relation in order to secure the required precision in operation. In applicant's co-pending application, Ser. No. 89,928, filed Nov. 16, 1970, and now abandoned, the same filing date of this instant application, the electrical operating components for the present machine toll are disclosed which are provided also to increase precision and efficiency during use by an improved speed control arrangement.

The primary object of this invention is to provision of an armature shaft and drive spindle arrangement which are interconnected in assembly to provide a balanced precision operation and wherein the armature shaft can be easily replaced in the user's plant with complete assurance that the balance of the armature shaft and spindle will continue to be maintained.

The machine tool thus basically comprises a tubular housing having a bearing removably supported in a cap removably disposed adjacent the lower end of the housing. An intermediate bearing fixed in said housing supports the upper end of a drive spindle which is supported at its lower end on the adjacent bearing and the lower end of the spindle includes a tool holder for containing a drill or other rotatable cutting or boring tool. The upper end of the spindle is provided with a longitudinal open end threaded bore in which a threaded stud is secured and projects outwardly or upwardly from the upper end of the spindle. An armature shaft includes a threaded bore axially aligned and engaged by the threaded stud to securely connect the shaft and spindle in assembly. The lower end of the shaft is also supported on the intermediate bearing and the upper end of the shaft is supported by an upper bearing carried in a removable cap disposed over the upper open end of the housing.

The lower end of the spindle containing the tool holder, the cap, and the housing are effectively sealed by a labyrinth type of seal configuration.

DETAILED DESCRIPTION

Figure 1:
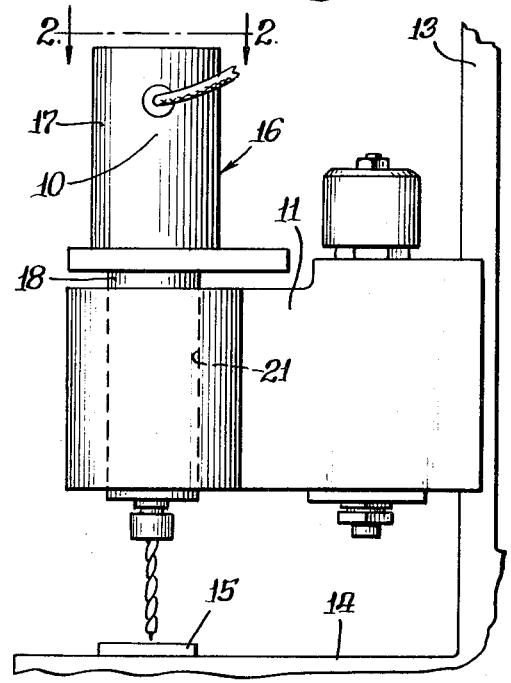
FIG. 1 is a side elevational view of a machine tool supported on a cabinet which includes electrical controls therefor.
Figure 2:
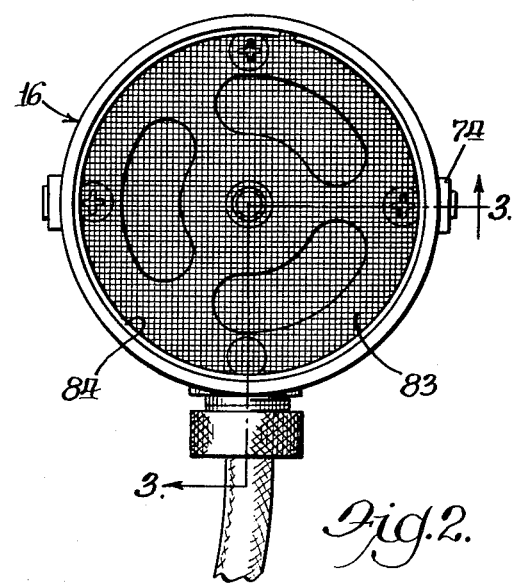
FIG. 2 is a top elevational view taken substantially along the line 2—2 of FIG. 1.

FIG. 1 discloses a machine tool generally designated 10 carried by a holder 11 mounted on a support frame or cabinet 13. The frame 13 includes a work holding table 14 on which a work piece 15 is suitably secured. The cabinet 13 and holder 11 are further provided with an electrical control cabinet (not shown) which includes the required controls and electrical components of the invention described in applicant's aforementioned co-pending patent application.

The machine tool 10 includes a housing 16 provided with an upper tubular housing portion 17 and a lower housing portion 18 respectively provided with chambers 19 and 20. The housing portion 18 is suitably supported in a vertical bore 21 provided in the holder 11.

A bearing support 22 is rigidly secured within the housing portion 18 and includes an axial bore 23 in which the outer race 24 of a ball bearing assembly 25 is rigidly secured. A drive spindle 26 is provided with an upper end portion 27 which is rotatably connected to an inner race 28 at the assembly 25. The upper end portion is provided with a threaded bore 29 in which a threaded stud 30 is secured. The stud 30 is threaded in the bore 29 and is locked against rotation by means of any suitable cement or bonding agent.

A removable cap 31 includes a flange 32 and a hub portion 33. The hub portion 33 is positioned within the bore 34 of a retainer sleeve 35 also provided with a flange 36, said cap 31 and sleeve 35 being connected over the open end of said chamber 20 by means of screws 37. The sleeve 35 is provided with an annular shoulder 38 against which the outer race 39 of a bearing assembly 40 abuts. The inner race 41 is supported on an enlarged cylindrical portion 42 of the spindle 26. A second bearing assembly 43 of identical dimension includes an outer race 44 and an inner race 45.

A nut 46 is threaded on a threaded portion 47 of the spindle 26 and securely clamps the bearing assemblies 40-43 in engagement with a sealing disc 55, hub 33 and a cylindrical portion 48. The spindle 26 includes said enlarged cylindrical portion 48 which includes an axially extending bore 49 in which a tool holding collet 50 is disposed. The collet 50 includes a clamping bore and jaw assembly 51 for securing a drill, etc. in conventional fashion by means of a collet nut 52.

The hub 33 of the cap 31 includes a face 53 provided with an annular undercut recess 54. The sealing disc is designated at 55 and includes an inner bore 56 which encircles the shaft portion 42 in engaging and sealing relation. The disc 55 also includes an annular undercut recess 57 which with the portions resulting from the undercut recess 54 provide a complemental interfitting of the seal and hub face so as to in effect establish a labyrinth arrangement which prevents the escape of lubricant and the entry of dust, etc. into the bearings and chamber 20.

The chambers 19 and 20 are divided by a wall member 59 having a bore 60. An armature shaft 61 includes a lower shaft portion 62 extending through the bore 60 and being provided with a threaded bore 63 which is threaded onto the stud 30. It should be noted that the lower end of the lower shaft portion 62 is spaced from the upper end of the drive spindle 26. It is important that the said ends do not contact. The shoulders of spindle 26 and shaft portion 62 are supported by and are aligned by the inner race 28 which holds said spindle and shaft portion in precise axial alignment.

Figure 3:
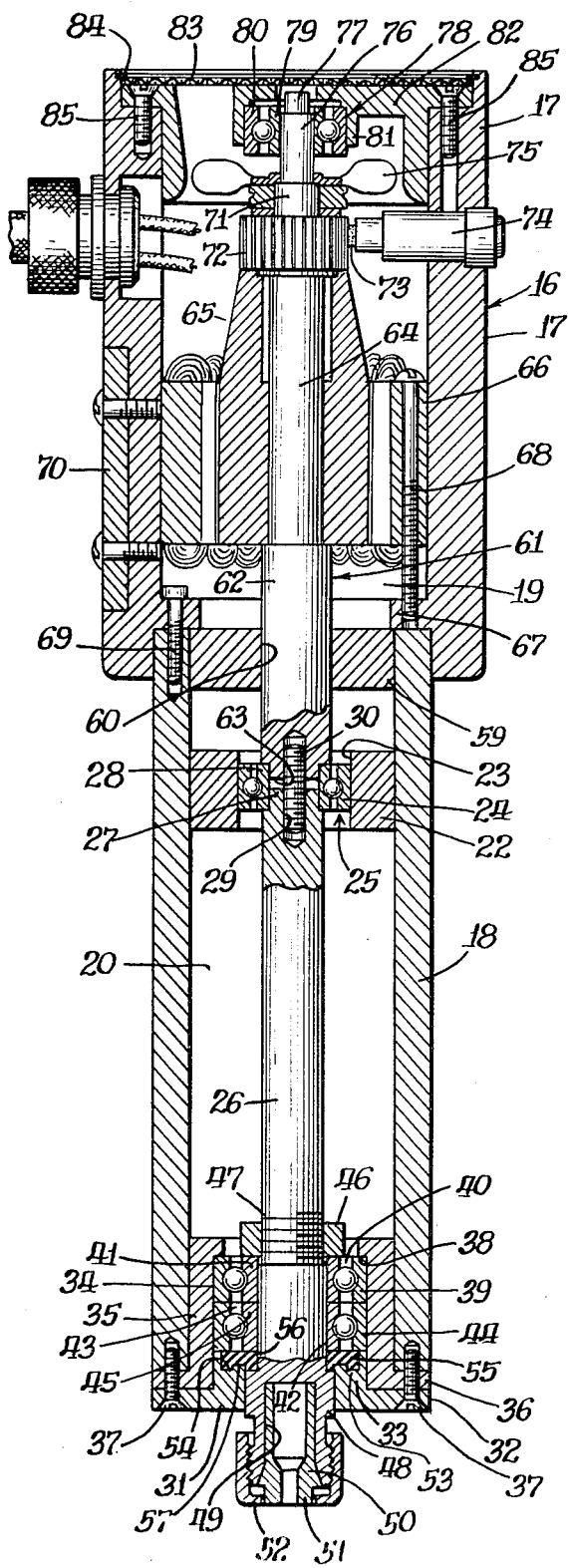
FIG. 3 is a cross-sectional view taken along the line 3—3 of FIG. 2.

The close tolerance fit of the shaft and spindle ends with respect to said race 28 provides for exact and precise co-axial positioning. The lower portion 62 is also supported on the bearing 25 as indicated in FIG. 3. The shaft also includes a second reduced diameter portion 64 which has an armature 65 connected thereto which rotates within a stator assembly 66 removably connected to a flange 67 of the housing 17 by means of screws 68. A plurality of cap screws 69, only one of which is shown, also connects the upper end of the reduced diameter portion of the housing 18 to the flange 67. A removable filter element 70 is generally shown.

The shaft portion 64 has connected thereto a further reduced diameter portion 71 which projects through and is connected to a commutator 72 engaging brushes 73 within brushholder 74, only one of which is shown. A suitable fan element 75 is connected to shaft portion 71 and said portion is further connected to a cylindrical bearing shaft portion 76 having at its upper end a tool engageable stud 77. An upper bearing assembly 78 includes inner race 79 connected to shaft portion 76 and outer race 80 supported in a cup-shaped portion 81 of an inner cap 82 which is removably connected to the upper open end of the housing portion 17. A screen 83 is removably locked to said housing portion 17 by means of a snap ring 84.

OPERATION

The electrical details of operation are described in applicant's aforementioned patent application and need not be further described as to the control of the spindle and tool holder. The present invention relating to the advantages of replacement and precision of operation will therefore be described. The commutator may become worn in time and thus must be repaired or replaced.

The armature shaft 64 may be easily removed by first removing the screen 83. The cap or motor end bell 82 is then removed by removing cap screws 85. The brushholders 74 are also removably connected by screws (not shown). These are loosened and the brushholders 74 are move laterally outwardly a sufficient amount to permit the armature 65 to clear. A socket wrench is then applied to the stud 77 and a suitable wrench engages and holds the lower end of the spindle whereupon the armature shaft may be unscrewed from the stud 30 whereupon the entire armature shaft assembly can be quickly and easily pulled through the upper open end of the housing portion 17. To replace the armature shaft the procedure is reversed, it being important, of course, to tighten the lower end 62 of the shaft 61 in secure relation with the stud 30.

The bearings may be lubricated life-time bearings and need not be replaced. The spindle also will require little maintenance, but, if so required, can be easily removed through the lower end of the housing 18 by removal of screws 37 and cap 31.

The advantages of the labyrinth type seal 55 have been described, and since the assembly will not permit foreign matter to enter the housing portion 18 which will not leak lubricant from the bearings, the spindle and associated parts will seldom need replacement.

Thus, it is clear that the objects have been fully achieved in that the armature and shaft assembly can be easily replaced. Further, the armature shaft and spin can be balanced individually outside of the housing, or in assembly, and when the armature is replaced by another with the housing a balanced total armature shaft and spindle assembly results which will guarantee the precision and accuracy which is desired in this type of machine tool.

It will be appreciated that the embodiment of the invention which has been chosen for the purpose of illustration and description herein is that which is preferred based upon requirements for achieving the objects of the invention and developing the utility thereof in the most desirable manner. It will be understood that the particular structure and functional aspect emphasized herein are not intended to exclude but rather to suggest such other modification and adaptation as fall within the spirit and scope of the invention as hereinbefore described.

What is claimed is:

1. A machine tool comprising:
    a cylindrical housing open at opposite axially first and second ends,
    a drive spindle within said housing and having at one end thereof a tool holder means connected thereto adjacent said first end of said housing,
    means rotatably supporting one end of said spindle adjacent said first end including a bearing retainer having an inner bearing supporting surface,
    first bearing means carried on said surface and rotatably connected to said first spindle end,
    a bearing cap removably connected to said bearing means adjacent said first end, said cap having a bore co-axial with said spindle and said tool holder means being rotatably disposed relative to said bore,
    an armature shaft in said housing having first and second ends and said armature shaft first end being in co-axial end-to-end alignment at a common juncture with said spindle,
    coupling means including a common intermediate bearing structure disposed in said housing intermediate said first and second housing ends and rotatably engaging and supporting the other end of said spindle and the first end of the shaft at their common juncture and forming an overlapping joint between the other end of said spindle and the first end of the shaft at the common juncture to prevent trans-axial misalignment of the ends of the spindle and shaft at their common juncture,
    an armature support cap removably connected to said housing over said housing second end, said armature support cap having a bearing unit carried therein and rotatably connected to the second end of said armature shaft, and
    said coupling means including at the common juncture means releasably drivingly connecting the first end of said armature shaft to the other end of said spindle where upon rotation of said shaft said spindle is driven thereby.

2. The invention in accordance with claim 1, said means releasably connecting said ends of said spindle and shaft including a threaded connection therebetween.

3. The invention in accordance with claim 1, said means releasably connecting said ends of said spindle and shaft including a threaded stud projecting from one end and a threaded bore in said other end in which said threaded stud is secured.

4. The invention in accordance with claim 3, said other end of said armature shaft being supported on said bearing structure.

5. The invention in accordance with claim 2, other end of said armature shaft having a reduced end portion providing a shoulder engaging said bearing structure.

6. The invention in accordance with claim 1, said housing including a first hollow cylindrical portion in which said armature and shaft assembly is positioned, and a second hollow cylindrical portion of smaller inner diameter removably connected to said first portion, and in which said bearing structure, spindle, and first bearing means are positioned.

7. The invention in accordance with claim 1, including sealing means disposed between said first bearing means and said cap, said means including a seal disc having an annular inner peripheral surface engaging said first end of said spindle, said cap having an annular undercut recess co-axial with said cap and said disc having a radially extending face provided with an annular undercut recess to provide portions disposed in and complemental to said undercut recess of said cap thereby effecting a labyrinth type of sealing configuration at the first end of said housing.

8. The invention in accordance with claim 7, said first end of said spindle including a spindle portion disposed in the bore of said cap and including a radially extending face portion engaging said radially extending face of said disc.

9. The invention in accordance with claim 8, said tool holder including a collet and nut assembly connected to said first portion and projecting outwardly from said bore.

10. The invention in accordance with claim 9, said one spindle end having a threaded portion and a nut on said threaded portion engaging said first bearing means and removably clamping said disc against said spindle portion.

11. The invention in accordance with claim 1, said armature support cap having an opening co-axial with said bearing unit.

12. The invention in accordance with claim 1, said second end of said spindle and said other end of said armature shaft being relatively axially spaced.

13. The invention in accordance with claim 1, said means releasably connecting said ends of said spindle and shaft including a threaded connection therebetween, and said second end of said spindle and said other end of said armature shaft being relatively axially spaced.

14. A machine tool comprising:
a housing open at opposite axially first and second ends,
a drive spindle within said housing and having at one end thereof a tool holder means connected thereto adjacent said first end of the housing,
means rotatably supporting said one end of the spindle including a spindle supporting bearing in said housing,
an armature shaft in said housing having first and second ends and said armature shaft first end being in co-axial end-to-end alignment at a common juncture with the other end of said spindle,
coupling means including a common intermediate bearing disposed in said housing intermediate the first and second housing ends and rotatably engaging and supporting the other end of said spindle and the first end of the shaft at their common juncture and forming an overlapping joint between the other end of the spindle and the first end of the shaft at their common juncture prevent trans-axial misalignment of the ends of the spindle and the shaft at their common juncture,
an armature shaft bearing carried at the second end of the housing and rotatably supported and connected to the second end of the armature shaft,
said coupling means at the common juncture including means releasably drivingly connecting the first end of the armature shaft to the other end of said spindle where upon rotation of said shaft said spindle is driven thereby.

15. The invention according to claim 14, and
said means releasably drivingly connecting the first end of the armature to the other end of the spindle including a member connecting the first end of the shaft with the other end of the spindle to prevent separation axially of the shaft from the spindle.

16. The invention according to claim 15, and
said member including threads couplable with the respective ends of the shaft and spindle to provide a threaded connection therebetween.

17. The invention according to claim 14, and
said means releasably being located within each respective end of the shaft and spindle and surrounded by said bearing structure.

18. The invention according to claim 14, and
said bearing structure including a bearing member recessed within and about the end of the shaft and spindle at the common juncture and a second fixed bearing member on the housing and bearing antifriction means between said first and second bearing members providing relative rotation of the spindle and shaft relative to the housing.

19. The invention according to claim 14, and
said means releasably being located within each respective end of the shaft and spindle and surrounded by said bearing structure,
said bearing structure including a bearing member recessed within and about the end of the shaft and spindle at the common juncture and a second fixed bearing member on the housing and bearing antifriction means between said first and second bearing members providing relative rotation of the spindle and shaft relative to the housing.

20. The invention according to claim 14, and
said means releasably connecting said ends of said spindle and shaft including a threaded stud projecting from one end and a threaded bore in said other end in which said threaded stud is secured.

* * * * *